Jan. 25, 1966   L. F. SHABRAM   3,230,663
INFLATABLE ARTICLE WITH INTEGRAL VALVE
Filed Oct. 1, 1962   3 Sheets-Sheet 1
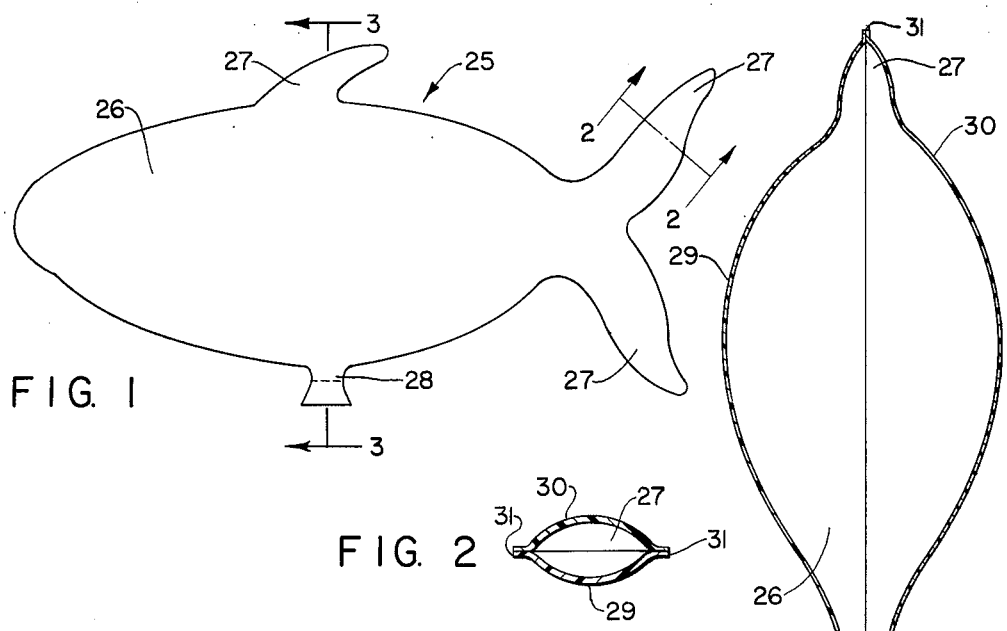
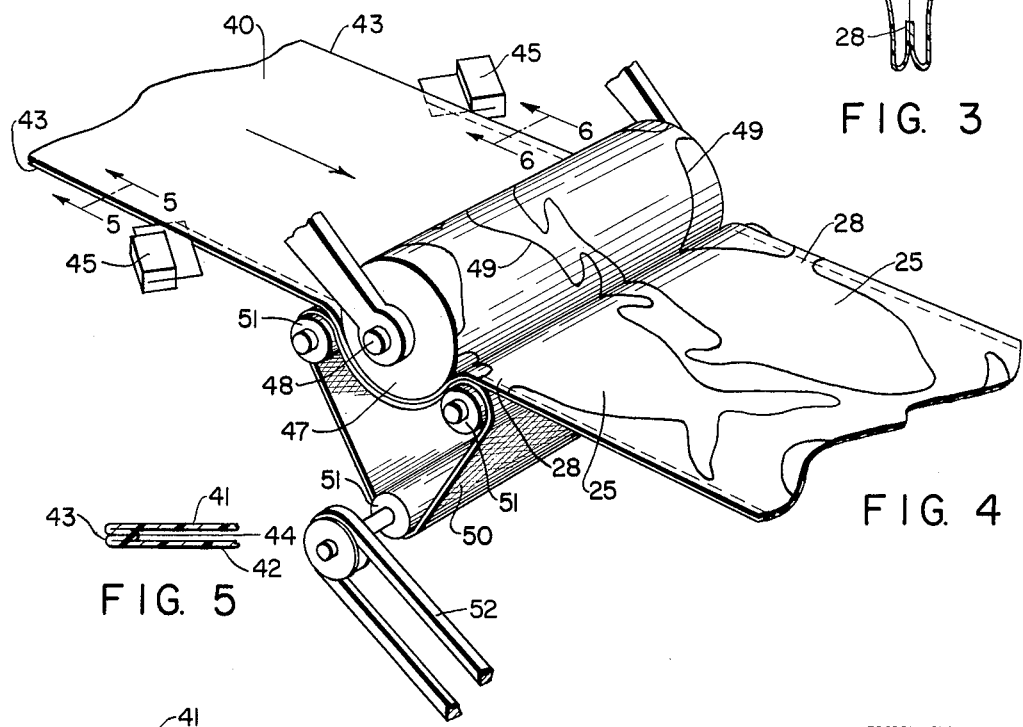
INVENTOR.
LYLE F. SHABRAM
BY Harold P. Beck
ATTORNEY Jan. 25, 1966 L. F. SHABRAM 3,230,663
INFLATABLE ARTICLE WITH INTEGRAL VALVE
Filed Oct. 1, 1962 3 Sheets-Sheet 2

INVENTOR.
LYLE F. SHABRAM
BY Harold P. Beck
ATTORNEY

Jan. 25, 1966      L. F. SHABRAM      3,230,663
INFLATABLE ARTICLE WITH INTEGRAL VALVE

Filed Oct. 1, 1962      3 Sheets-Sheet 3

INVENTOR.
LYLE F. SHABRAM
BY Harold P. Beck
ATTORNEY

United States Patent Office 3,230,663
Patented Jan. 25, 1966

3,230,663
INFLATABLE ARTICLE WITH INTEGRAL VALVE
Lyle F. Shabram, Carmel, Calif., assignor to Consolidated Thermoplastics Company, Stamford, Conn., a corporation of Delaware
Filed Oct. 1, 1962, Ser. No. 227,268
5 Claims. (Cl. 46—90)

My invention is directed to inflatable articles such as children's toys including various configurations such as a fish, duck, penguin, seal, alligator and the like. Elastomeric balloons of various configurations are well known, but cannot provide the intricate configurations having depending inflatable appendages as are available with my invention.

My invention is further directed to a unique valve structure integral with the inflatable article and easily operable for inflating the article. My valve structure includes a closure member automatically operable upon inflation of the article to close the valve and maintain the article inflated. This valve structure is fabricated simultaneously with the fabrication of the body of the inflatable article.

My valve structure is also unique in that it is flat when the article is not inflated thereby simplifying the packing and shipping of the articles.

My method for fabricating inflatable articles uses conventional plastic film such as polyethylene or the like, folded in face-to-face relationship, and gusseted along at least one edge when an integral valve structure is fabricated with the article. The valved articles are fabricated at an extremely high rate on automatic equipment thereby reducing the unit price.

My method and apparatus produces a finished inflatable article with an integral valve for inflating the article and maintaining it in an inflated condtion. Simple, inexpensive, rapid packaging of the articles is possible in conjunction with my fabricating method.

In the drawings I have shown a present preferred embodiment of my invention in which:

FIGURE 1 is a side elevation view of an inflated article made according to my invention;

FIGURE 2 is a cross section taken on line 2—2 of FIGURE 1;

FIGURE 3 is a cross section taken on line 3—3 of FIGURE 1;

FIGURE 4 is a perspective of an apparatus for fabricating articles according to my invention;

FIGURE 5 is a cross section on line 5—5 of FIGURE 4;

FIGURE 6 is a cross section taken on line 6—6 of FIGURE 4;

Figure 7:
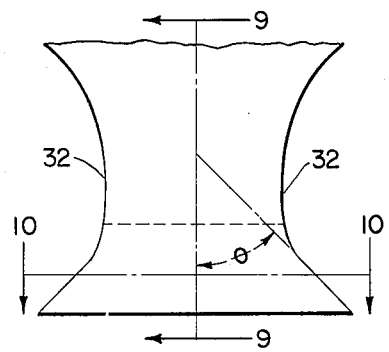
FIGURE 7 is a side elevation view of a valve made according to my invention.

One aspect of my invention is directed to an inflatable article having an integral valve formed simultaneously with the body of the article. The article is fabricated from two thin flexible thermoplastic sheets of film, such as polyethylene, which are bonded, preferably by heat-sealing, along their periphery in the shape of the desired article. Each plastic sheet is preferably thicker than one-half mil, with a best thickness of about two mils, and a maximum thickness dictated only by the desired article flexibility and apparatus and method limitations imposed by the heat-sealing. The valve is fabricated simultaneously with the heat-sealing or bonding of the periphery of the article and the sides of the valve form a continuation of the periphery of the article. The inflatable article is similar to a rubber balloon but can be made in various shapes and configurations which are unavailable in the conventional balloon type structure.

The valve integral with the inflatable article includes an outer housing which is formed by extensions of the plastic sheet, bonded or heat-sealed together along the side edges to leave the outer edges separated to form an opening through which the article can be inflated, and a closure for the valve formed by at least one of the outer edges having an extension folded inwardly inside the valve housing and heat-sealed or bonded therein simultaneously with the bonding of the side edges of the valve. Upon inflation of the article to a substantial extent, the in-folded extension is forced against the opposite wall of the valve housing by a back pressure from the inflation pressure within the article thereby closing the opening in the valve and maintaining the article in an inflated condition.

My invention also includes a method for fabricating an inflatable article as described above and includes the steps of placing sheets of plastic in face-to-face relationship with the longitudinal side edge of at least one of the sheets having an edge portion folded inwardly between the sheets; bonding or heat-sealing the sheets together along a peripheral portion to define a desired configuration for the article; preferably simultaneously bonding the sheets together in the area of said folded edge portion of the sheet to form an integral valve for the article; and removing any scrap material from the article. My preferred mode of fabricating the article is to supply a gusseted film, having a gusset at one or both transverse sides, positioning the gussets inside the top and bottom sheets of the film; heat sealing the top and bottom sheets together along a peripheral course to form a desired configuration for the article, simultaneously heat-sealing the sheets together in the area of one of the gussets to form an integral valve on the article. The internal fold of the gusset may then be perforated to provide an inflation opening into the article or the internal fold may be maintained intact in an unperforated condition until the user desires to use the article and the user then pierces the internal fold with a sharp instrument. In the preferred form of my invention, I have found that it is desirable to slit the internal fold of the gusset as the film is being fed to the heat-sealing apparatus thereby the finished article is complete and ready for inflation after heat-sealing.

My invention also includes an apparatus for fabricating an inflatable article as described above and includes means fod feeding a continuous supply of side-gusseted plastic film, a rotatable drum with its axis transverse of the direction of movement of the plastic film, a continuous belt positioned immediately adjacent the rotatable drum such that the plastic film moves over the drum between the continuous belt and the rotatable drum, heating wires affixed to the periphery of the rotatable drum, the wires being positioned in the configuration of the articles to be fabricated, electrical means to supply power to the heating wires so that the wires can engage the plastic film as it passes over the drum and heat-seal the sheets of film together in the desired manner and provide perforations for separating the scrap from the articles or the articles from each other; and means to remove the fabricated articles from the rotatable drum. My apparatus also includes slitting knives for slitting the internal fold of the gusset on one or both sides of the film if desired. This general type of apparatus is described in detail in U.S. patent applications Serial Numbers 729,350, now abandoned; 70,481, now Patent 3,142,602; 155,883, now Patent 3,122,466 and U.S. Patent Number 3,007,835 which are incorporated herein by reference.

Figures 8, 9, 11:
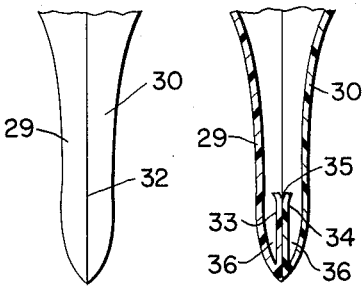
FIGURE 8 is an end elevation view of the valve of FIGURE 7.
FIGURE 9 is a cross section taken on line 9—9 of FIGURE 7.
FIGURE 11 is a cross section similar to FIGURE 9 showing a modified form of my valve.
Figure 10:
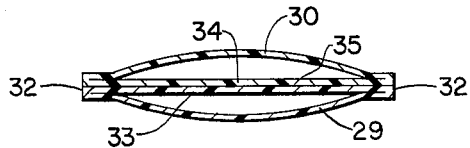
FIGURE 10 is a cross section taken on line 10—10 of FIGURE 7.
Figure 13:
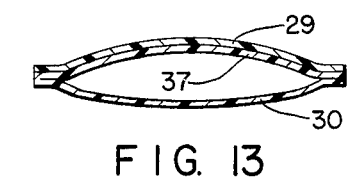
FIGURE 13 is a cross section taken on line 13—13 of FIGURE 12.

Referring specifically to the drawings, FIGURE 1 shows an inflatable article such as a fish 25 having an inflatable body portion 26, various inflatable fins 27 and an integral valve 28. The inflatable article is fabricated from a pair of spaced thermoplastic sheets 29 and 30 bonded or heat-sealed together along the periphery 31 in a desired configuration such as the fish illustrated in FIGURES 1 and 2. The valve 28 is formed simultaneously with the remainder of the inflatable article and includes a housing formed of extensions of sheets 29 and 30 bonded or heat-sealed together along side seams 32. A closure for the valve is provided by in-folded extensions of or flaps on the sheets 29 and 30—these extensions being designated 33 and 34 respectively in FIGURE 9. The in-folded portions 33 and 34 are bonded or heat-sealed to and between the sheets 29 and 30 along side seams 32 as shown in FIGURE 10. The portions 33 and 34 are free to move relative to each other at their face-to-face abutting portion 35 thereby providing an opening at 35 into the body 26 of the inflatable article for inflation thereof. The portions 33 and 34 also can move relative to sheets 29 and 30 forming the valve housing. When the article has been inflated to a substantial extent a back pressure is exerted in the areas 36 thereby forcing the flaps 33 and 34 against each other in the area 35 as shown in FIGURE 9 to close the opening between the flaps. Thus the in-folded flaps 33 and 34 provide a closure for the valve 28 which is actuated automatically by the inflation pressure within the article.

As shown in FIGURE 7, the preferred angle $\theta$ for the bonded or sealed edges 32 of the valve is about 30° from the vertical. I have found this angle $\theta$ of 30° to be the best operable angle from the standpoint of fabricating the article and also providing an effective valve mechanism as described above.

Figure 19:
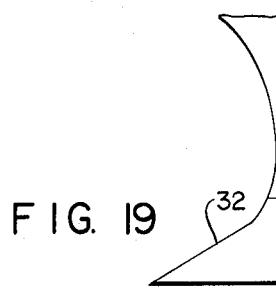
FIGURE 19 shows a fifth modified form of my valve.
Figure 20:
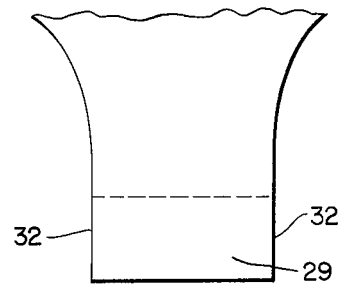
FIGURE 20 shows a sixth modified form of my valve.

In FIGURES 19 and 20 I have shown modified valve having various angles $\theta$. FIGURE 20 shows a valve which is constructed substantially identically to FIGURES 7, 8, 9 and 10 with the exception that the bonded or heat-sealed sides 32 are substantially parallel and thus the angle $\theta$ is about zero.

In FIGURE 19 I have shown a further modified valve which is constructed substantially identically to FIGURES 7 through 10 with the exception that the bonded or heat-sealed edge 32 extend outwardly at an angle of about 60° from the vertical. Thus as angle $\theta$ increases, the effectiveness of the valve is not substantially impaired until the angle reaches at least about 80° or slightly more. Even though my preferred embodiment for angle $\theta$ is 30°, my valve is fully effective where $\theta$ is from zero to 45° and the outer limits of $\theta$ are zero to about 80°.

It should be noted that, as shown in FIGURE 7, the valve has a necked-in portion and that preferably the in-folded flaps 33 and 34 extend inwardly in the valve to approximately the point where the neck portion of the valve commences. This is effectively shown in FIGURE 7 by the horizontal dashed line indicating the top inner end of the infolded flaps 33 and 34. The in-folded flaps can extend into and beyond the neck portion of the valve, but I prefer to limit the length of the in-folded portions to that shown in FIGURE 7 both for proper operation of the valve and for economy of materials used in fabricating the inflatable article. Of course, in a valve of the type shown in FIGURE 20 there is no necked-in portion and the in-folded flaps can be limited as shown by the dashed line or can extend inwardly into the body 26 of the inflatable article.

In FIGURE 11 I have shown a valve constructed substantially identical to that shown in FIGURES 7 to 10, however, the back pressure in the right area 36 resulted in flap 34 being pushed against flap 33 which in turn was pushed against the valve housing 29. FIGURE 11 shows the valve in inflated condition and accurately depicts the manner in which the valve frequently functions when the back pressure on both flaps 33 and 34 is not immediately equalized upon inflation of the article. As shown in FIGURE 11, the single flap 34 effectively closes the valve opening and maintains the inflated article in an inflated condition.

Figure 12:
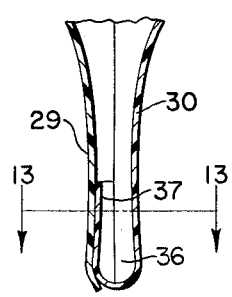
FIGURE 12 is a cross section similar to FIGURE 9 showing a second modified form of my valve.

In FIGURE 12 I have shown a modified valve in which only the sheet 30 has an infolded portion or flap 37. Thus the double infolded portion shown in FIGURES 7 through 10 has been eliminated and only one closure flap 37 is utilized in this structure. FIGURE 12 shows the valve when the article is in inflated condition and a back pressure 36 exists in the area indicated. Otherwise the valve of FIGURE 12 is constructed identical to the valves previously described.

Figure 14:
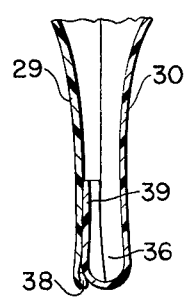
FIGURE 14 is a cross section similar to FIGURE 9 showing a third modified form of my valve.

FIGURE 14 shows a further modified valve having double in-folded flaps, however, the in-folded flap 38 on the thermoplastic sheet 29 is short while the in-folded flap 39 on the sheet 30 extends a substantial distance into the valve and the body of the inflatable article. The valve shown in FIGURE 14 is constructed and operates substantially similar to that shown in FIGURES 11 and 12. A back pressure in the area indicated 36 closes the valve by forcing the flap 39 against sheet 29 to maintain the article in an inflated condition.

Figure 15:
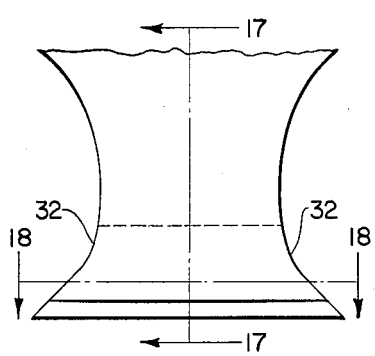
FIGURE 15 is a side elevation view of fourth modified form of my valve.
Figure 16:
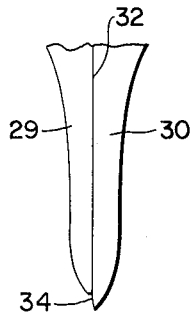
FIGURE 16 is a side elevation view of the modified valve shown in FIGURE 15.
Figure 17:
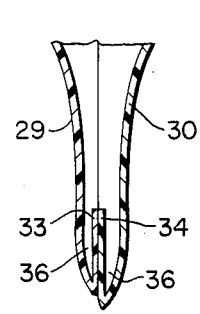
FIGURE 17 is a cross section taken on line 17—17 of FIGURE 15.
Figure 18:
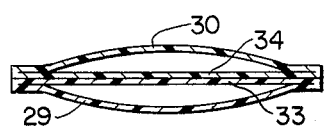
FIGURE 18 is a cross section taken on line 18—18 of FIGURE 15.

In FIGURE 15 I have shown a valve substantially similar to the valve shown in FIGURES 7 through 10 with the exception that the in-folded flap 34 and sheet 30 extend downwardly below the in-folded flap 33 and sheet 29 thus permitting an easy opening of the valve to inflate or deflate the article in the manner to be described hereinafter. This downward extension permits the user to easily grasp and open the valve for inflating the article. The valve of FIGURES 15–18 is identical to the valve structure of FIGURES 7–10 with the exception noted above.

Figure 21:
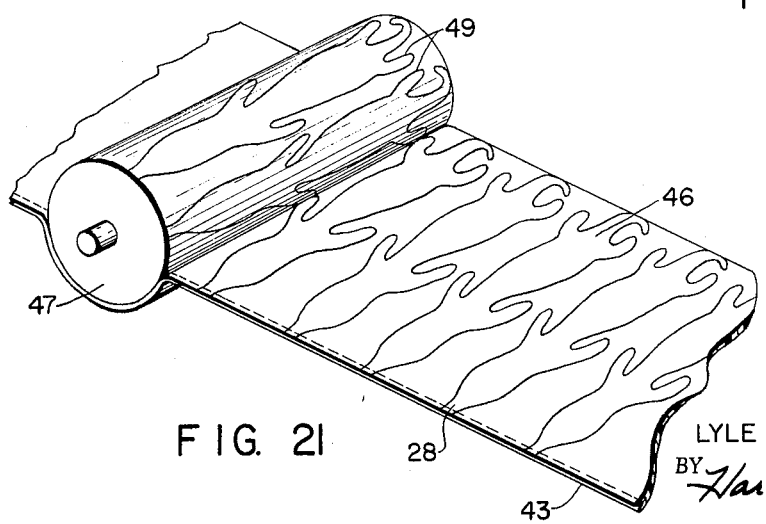
FIGURE 21 is simliar to FIGURE 4 and shows a modified form of apparatus for fabricating articles according to my invention.

Referring specifically to FIGURE 4, plastic tubing 40 having a top film layer 41 and a bottom film layer 42 connected by a gusseted edge 43 having an inside fold 44 is fed in the direction of the arrow in FIGURE 4. Preferably the inner fold 44 is slit by slitting devices 45 on both edges (see FIGURE 6). The tube 40 is gusseted on both sides if the article is of the type shown in FIGURE 4 wherein a plurality of articles 25 are fabricated with the valves 28 facing outwardly toward the gusseted sides of the tube 40. In FIGURE 21 I have shown the production of articles 46 in the configuration of an alligator wherein the valve 28 forms the snout portion of the alligator and only one transverse gusseted end is necessary, but otherwise the production of the article is identical to that described in FIGURE 4.

I can also feed two single continuous sheets of plastic in face-to-face relationship with each other, and infold one or both of the side edges of the sheets to give a slitted gusseted configuration to the side edges as shown in FIGURE 6. The fabricated valve would have the form shown in FIGURE 12. The various forms of tubular or flat plastic film which can be used in the present invention will be apparent to persons familiar with this art since the primary factor in the fabrication requires that the edge of the film be gusseted or infolded on the side where the integral valve is formed.

The apparatus for heat-sealing and severing the inflatable article is described in the aforementioned patent and patent applications and will not be described in detail herein. Briefly this apparatus includes a rotatable drum 47 mounted on a transverse axis 48 and heating means such as wires 49 are provided integral with the surface of the drum and formed in the configuration of the articles to be formed. The heating means, such as wires 49, function to heat-seal the plastic sheets together and dies cut the articles from the sheets. Wires 49 are provided with a suitable connection to electrical power for heating the wires to heat-seal the edges of the article and to form the valve 28. A continuous belt 50 mounted on rollers 51 in a triangular configuration and engagable with a substantial portion of the periphery of the rotatable drum maintains the plastic film tightly against the heated wires as described in the aforementioned patent and patent applications. Suitable drive means for the rollers 51 is provided such as a driven belt 52. The wires 49 heat-seal the sheets 41 and 42 together in the desired configuration for the article and simultaneously heat-seal the edges 32 of the sheets together to form the valve housing. The flaps 33 and 34 or 37 or 39 are simultaneously heat-sealed with the edges 32.

It is also apparent that well known apparatus can be provided for feeding glue in a definite configuration onto one of the sheets of plastic and interposing the second sheet against the first sheet with a subsequent cutting operation to die cut the desired article with the periphery bonded by the glue. The basic configuration of the article and the valve will remain the same irrespective of the mode of bonding the periphery of the desired article. My preferred method for fabricating the article and valve utilizes heat-sealing as described above.

Figure 22:
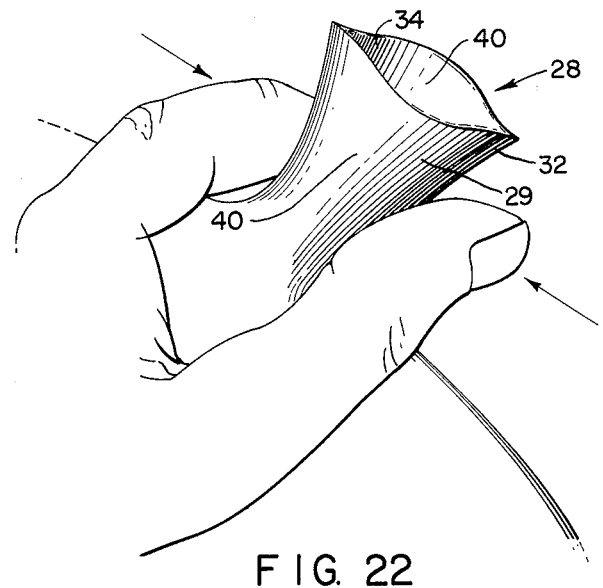
FIGURE 22 is a perspective showing the manner of using a valve made according to my invention.

FIGURE 22 illustrates the manner in which the valve is pinched open for inflating the article. The user's fingers are positioned on seams 32 at opposed positions at about the necked-in portion of the valve housing. The valve housing is then pressed inwardly in the direction of the arrows shown in FIGURE 22 which results in the valve opening to permit the manual inflation of the article. To close the valve, the user's fingers are placed in opposed positions on opposite sides of the valve and not engaged with the seams 32. In this manner, the valve is closed by pinching the valve housing in a direction normal to the flat sides of the housing.

While I have described the present preferred embodiment of my invention, it may be otherwise embodied within the scope of the following claims.

I claim:
1. An inflatable plastic article having an integral valve; comprising two thin, flexible plastic sheets heat-sealed together along their periphery in the shape of the article, said valve being joined to and extending outwardly from said periphery and being extensions of said sheets, the outer housing of the valve being formed by said sheet extensions heat-sealed together along side edges to leave outer edges of the sheets unattached and forming an opening through which the article is inflated; and at least one of said outer edges being folded inwardly of and positioned within said outer housing to provide a flap-type closure for the valve, said closure closing the opening in the outer housing upon substantial inflation of the article by exerting a back pressure against said infolded edge, said side edges of the valve housing being easily, manually engaged and pressed inwardly toward each other to spread central portions of the valve sheets apart thereby providing said valve opening and permitting simple inflation of the article by blowing in the opening.
2. An article according to claim 1 wherein:
 (a) said valve housing has an axis extending centrally through the valve opening, and,
 (b) said side edges of the valve housing are heat sealed at an angle of about 30° outwardly from said axis.
3. An article according to claim 1 wherein:
 (a) each of said side edges of the valve housing are heat sealed in a circular configuration concave inwardly to permit simple manual operation of the valve by squeezing the side edges toward each other to move central portions of the valve forming sheets away from each other for easy inflation of the article.
4. An article according to claim 1 wherein:
 (a) each of the outer edges of the sheets are folded inwardly of and positioned within the housing to provide a flap-type closure for the valve.
5. An article according to claim 1 wherein:
 (a) said outer edge folded inwardly of and positioned within the housing is heat-sealed to said side edges.

References Cited by the Examiner

UNITED STATES PATENTS

| | | | |
|---|---|---|---|
| 1,625,394 | 4/1927 | Roberts | 156—251 |
| 1,834,078 | 12/1931 | Stein | 156—251 |
| 2,625,770 | 1/1953 | Steen et al. | 46—90 |
| 2,697,229 | 12/1954 | Kreuger | 273—65 X |
| 2,698,496 | 1/1955 | Miller | 46—90 |
| 2,864,201 | 12/1958 | Leise | 46—90 |
| 3,007,835 | 11/1961 | Rosenberg et al. | 156—251 |
| 3,054,441 | 9/1962 | Gex et al. | 156—515 |
| 3,083,757 | 4/1963 | Kraft et al. | 156—515 |

DELBERT B. LOWE, *Primary Examiner.*

J. M. BERGERT, *Examiner.*